United States Patent [19]

Hughes et al.

[11] Patent Number: 5,100,980

[45] Date of Patent: Mar. 31, 1992

[54] PROCESS FOR EFFICIENT MOLECULAR WEIGHT CONTROL IN COPOLYMERIZATION

[75] Inventors: Kathleen A. Hughes; Graham Swift, both of Blue Bell, Pa.

[73] Assignee: Rohm and Haas Company, Philadelphia, Pa.

[21] Appl. No.: 676,040

[22] Filed: Mar. 27, 1991

Related U.S. Application Data

[62] Division of Ser. No. 475,580, Feb. 6, 1990, Pat. No. 5,055,540.

[51] Int. Cl.$^5$ .................. C08F 4/10; C08F 222/06
[52] U.S. Cl. ........................... 526/91; 526/240; 526/318.2; 526/271
[58] Field of Search ............ 526/91, 240, 271, 318.2, 526/264

[56] References Cited

U.S. PATENT DOCUMENTS

| | | | |
|---|---|---|---|
| 4,314,044 | 2/1982 | Hughes | 526/91 X |
| 4,659,793 | 4/1987 | Yang | 526/91 |
| 4,725,655 | 2/1988 | Denzinger | 526/65 |

*Primary Examiner*—Joseph L. Schofer
*Assistant Examiner*—M. Nagumo
*Attorney, Agent, or Firm*—James G. Vouros

[57] ABSTRACT

This invention relates to copolymers containing as co-polymerized monomer units aliphatic monoethylenically unsaturated dicarboxylic acids such as maleic acid, monoethylenically unsaturated monocarboxylic acids such as acrylic acid and carboxyl-free monoethylenically unsaturated monomers such as alkyl esters of acrylic acid. This invention particularly relates to the use of low levels of copper ions in an aqueous polymerization process to promote copolymerization of the above-mentioned monomers at high conversion while maintaining and improving molecular weight control. These copolymers are useful primarily as antiscalants, dispersants, hard surface cleaners, detergent builders and incrustation inhibitors.

14 Claims, 1 Drawing Sheet

PROCESS FOR EFFICIENT MOLECULAR WEIGHT CONTROL IN COPOLYMERIZATION

This is a divisional of application Ser. No. 475,580, filed Feb. 6, 1990 now U.S. Pat. No. 5,055,540.

FIELD OF THE INVENTION

This invention relates to copolymers containing as copolymerized monomer units aliphatic monoethylenically unsaturated dicarboxylic acids such as maleic acid, monoethylenically unsaturated monocarboxylic acids such as acrylic acid and carboxyl-free monoethylenically unsaturated monomers such as alkyl esters of acrylic acid. This invention particularly relates to the use of low levels of copper ions in an aqueous solution polymerization process to promote copolymerization of the above-mentioned monomers at high conversion while maintaining and improving molecular weight control. These copolymers are useful primarily as antiscalants, dispersants, hard surface cleaners, detergent builders and incrustation inhibitors.

BACKGROUND OF THE INVENTION

Copolymers of monoethylenically unsaturated dicarboxylic acids, monoethylenically unsaturated monocarboxylic acids and carboxyl-free monoethylenically unsaturated monomers are useful as antiscalants, dispersants, incrustation inhibitors and builders in detergents, deflocculants and drilling fluid aids. Several techniques employing aqueous polymerization systems have been previously described in the preparation of these copolymers.

Initially, high molecular weight polymers of this type were produced using a redox system, while the more desirable low molecular weight polymers were produced using a chain transfer agent such as a mercaptan. However, mercaptans are undesirable because of both their expense and unpleasant odor. U.S. Pat. No. 4,314,044 ('044) attempted to solve this problem of using mercaptans by describing an aqueous process for the preparation of low molecular weight water-soluble copolymers of acrylic and methacrylic acid with unsaturated dicarboxylic acids such as itaconic acid, fumaric acid and maleic acid. The '044 patent disclosed the use of a catalytic system comprising an initiator and a metal salt in a molar ratio of initiator to metal ion of from about 10:1 to about 150:1 and the initiator being present in an amount of from 0.5 to about 35 weight percent based on the weight of the monomers present.

The process of the '044 patent was modified by U.S. Pat. No. 4,659,793 ('793) which describes an aqueous batch process for the preparation of copolymers of monoethylenically unsaturated aliphatic dicarboxylic acids with α,β-ethylenically unsaturated monomers. By using one of various metal ions at low levels, such as 1 to 250 ppm, the residual monomer content was claimed to be reduced to 0.5% or less based on the total weight of the dried copolymers. The '793 patent describes a copolymer containing as copolymerized monomer units of from 25 to 55% by weight of the dicarboxylic acid and from 45 to 75% by weight of the ethylenically unsaturated monomers and said copolymers are claimed to have a weight average molecular weight of from about 2,000 to 1,000,000. However, the lowest level of the dicarboxylic acid exemplified in the '793 patent is 30%, yielding a weight average molecular weight of from 25,000 to 40,000. The metal ions disclosed as suitable for use in the process of the '793 patent are $Zn++$, $Co+++$, $Co++$, $Cu++$, $Mo++$, $Fe+++$, $Fe++$, $Cr+++$, $Ni++$, $Ce++++$ and $Ce++$. No metal ion is shown to have any advantage over any of the other metal ions and only $Fe++$ is shown in the specific examples of the patent.

Another process for the synthesis of these polymers is a continuous cascade process disclosed in U.S. Pat. No. 4,725,655. Described in this patent is the copolymerization of monoethylenically unsaturated dicarboxylic acids in concentrations of from 10 to 60% by weight of the monomers, monoethylenically unsaturated monocarboxylic acids in concentrations of 40 to 90% by weight of the monomers and optionally carboxyl-free monomers in concentration of not more than 20% by weight of the monomers. This reaction is carried out in the presence of from 0.5 to 6% by weight of a water-soluble, free radical forming initiator. Multiple reactors are required for this procedure with the preferred number being at least three. This process does not claim the use of any metal salt.

Copending U.S. patent application Ser. No. 353,376 ('376) filed on May 17, 1989, now abandoned commonly assigned to the same assignee as the present invention, also describes a method of preparation of copolymers of monoethylenically unsaturated aliphatic dicarboxylic acids with α,β-ethylenically unsaturated monomers. The '376 application describes a continuous or batch process for producing copolymers of more consistent composition by the simultaneous addition of the monomers to the reaction vessel. The monoethylenically unsaturated dicarboxylic acid concentration is from 5 to 65%, preferably from 10 to 60% by weight of the total monomer concentration and the monoethylenically unsaturated monocarboxylic acid concentration is from 35 to 95%, preferably from 40 to 90% by weight of the total monomer concentration. This procedure also makes use of a metal salt in concentrations from 1 to 200 ppm, preferably from 1 to 25 ppm based on the total weight of the monomers. The metal ions include water soluble salts of cobalt, iron, copper, nickel, manganese, zirconium and zinc. Again, no metal ion is shown to have any advantage over any of the other metal ions in controlling the molecular weight of the copolymer.

Currently, there is no process to control the molecular weight and degree of branching during the preparation of copolymers containing low levels of aliphatic monoethylenically unsaturated dicarboxylic acids of from about 3 to 25%. When any of the previously described techniques are used to synthesize copolymers at the range of the current invention, the copolymer tends to branch dramatically during synthesis and the molecular weight builds. In most circumstances this causes the reaction solution to increase viscosity and eventually gel. When copolymers have been synthesized under these prior art techniques, the molecular weights have generally been too high and therefore, the copolymers have been undesirable.

It is therefore a principal object of this invention to furnish novel water soluble, low molecular weight copolymers containing low levels of monoethylenically unsaturated dicarboxylic acid units, such as maleic acid, and high levels of the monoethylenically unsaturated monocarboxylic acid units, such as acrylic acid. Detergent and water treatment formulations containing these novel copolymers are also within the invention.

It has now been discovered that polymers containing low levels of monoethylenically unsaturated aliphatic dicarboxylic acids can be successfully synthesized and the molecular weight controlled at a desirable level by using low levels of copper salt as polymerization moderator. Surprisingly, copper salt has been found to be unique in its properties among the common metal salts disclosed in the previous art.

SUMMARY OF THE INVENTION

The present invention provides an aqueous batch or continuous process for the preparation of copolymers of aliphatic monoethylenically unsaturated dicarboxylic acids, especially maleic acid, monoethylenically unsaturated monocarboxylic acids such as acrylic acid and carboxyl-free monoethylenically unsaturated monomers such as alkyl esters of acrylic acid. Copolymers with lower levels of aliphatic monoethylenically unsaturated dicarboxylic acid content of controlled molecular weight can be prepared and their molecular weight controlled by using the process of this invention as compared to copolymers made from processes described in the previous art using similar monomers.

We have found the object of this invention can be achieved by using low levels of copper salt as a metal salt polymerization moderator in either a continuous or a batch process. In the continuous process the metal salt polymerization moderator can be simultaneously cofed into a reaction vessel along with the monomers of this invention. In the batch process the metal salt polymerization moderator can be contained in an initial charge of monomers in the reaction vessel, or cofed into the reaction vessel along with the monomers, or a combination of both.

These copolymers synthesized according to our process can be used as antiscalants and incrustation inhibitors.

DETAILED DESCRIPTION OF THE INVENTION

We have discovered a process for the preparation at high conversion of polymers containing as polymerized monomer units aliphatic monoethylenically unsaturated dicarboxylic acids, monoethylenically unsaturated monocarboxylic acids and carboxyl-free monoethylenically unsaturated monomers. We have discovered that the use of low levels of copper salt in an aqueous polymerization facilitates improved molecular weight control and, in addition, allows for the preparation of a broad range of polymer compositions. Although the mechanism of the process set forth herein is not fully understood, it is believed that the copper salts used in the reaction of this invention act as polymerization moderators, that is they control the molecular weight, the chain length and the degree of branching. The theory of this invention is presented here as a possible explanation to the surprising results obtained and in no way is intended to limit the scope of this invention.

The polymerization can be run using a batch process or a continuous process. In the batch process an aqueous solution of the dicarboxylic acid monomer is placed in a reaction vessel and the copper salt polymerization moderator is added thereto. The solution is heated and then an aqueous solution of one or more of the comonomers, a solution of initiator and a neutralizing solution are added to the reaction vessel over a period of several hours. An alternate variation involves combining two or more of the solutions prior to addition to the reactor, and a further alternative involves the addition of the monomers as separate solutions.

In the continuous process the reactor is initially charged only with water or an aqueous solution of the metal salt polymerization moderator and is heated to an increased temperature. The metal salt can be simultaneously cofed into the reaction vessel or contained in the initial charge, or both. Monomer, initiator and neutralizer solutions may then be added at a substantially uniform rate, whereby a substantially uniform rate may include the simultaneous, linear addition of the cofed solutions or the addition of the cofed solutions at slightly different rates and times. Preferably, three solutions are cofed into the reaction vessel, the monomer solution, the initiator solution and the neutralizer solution. A satisfactory alternative variation involves combining two or more of the three solutions prior to addition to the reactor, and a further alternative involves the addition of the monomers as separate solutions. The rate and time of addition of the monomers and initiator can be varied to account for the difference in reactivity of the monomers and thereby maximize the conversion of the monomers.

Starting comonomers used in this process are monoethylenically unsaturated dicarboxylic acids containing from 4 to 6 carbon atoms per molecule, their alkali metal and ammonium salts, and the anhydrides of the cis dicarboxylic acids. Examples of suitable monomers include maleic acid, itaconic acid, mesaconic acid, fumaric acid, citraconic acid and the anhydrides of cis dicarboxylic acids, such as maleic anhydride. Maleic anhydride is preferred among these monomers. The monoethylenically unsaturated dicarboxylic acid concentration can be from 3 to 25% and preferably from 5 to 23% by weight of the total monomer concentration.

Starting comonomers include monoethylenically unsaturated monocarboxylic acids containing from 3 to 6 carbon atoms per molecule and include acrylic acid, methacrylic acid, vinyl acetic acid, crotonic acid and acryloxypropionic acid. The preferred monoethylenically unsaturated monocarboxylic acid is acrylic acid. The concentration of these monomers is from 75 to 97% and preferably from 77 to 95% by weight of the total monomer concentration.

Other starting monomers can be carboxyl-free monoethylenically unsaturated monomers which include alkyl esters of acrylic or methacrylic acids such as methyl acrylate, ethyl acrylate, butyl acrylate, methyl methacrylate, ethyl methacrylate, butyl methacrylate and isobutyl methacrylate; hydroxyalkyl esters of acrylic or methacrylic acids such as hydroxyethyl acrylate, hydroxypropyl acrylate, hydroxyethyl methacrylate, and hydroxypropyl methacrylate; acrylamide, methacrylamide, N-tertiary butyl acrylamide, N-methyl acrylamide, N,N-dimethyl acrylamide; acrylonitrile, methacrylonitrile, allyl alcohol, allyl sulfonic acid, allyl phosphonic acid, vinylphosphonic acid, dimethylaminoethyl acrylate, dimethylaminoethyl methacrylate, phosphoethyl methacrylate, N-vinyl pyrollidone, N-vinylformamide, N-vinylimidazole, vinyl acetate, styrene, vinyl sulfonic acid and its salts, and 2-acrylamido-2-methyl propane sulfonic acid (AMPS) and its salts. The concentration of carboxyl-free monoethylenically unsaturated monomers can be from 0 to about 80% by weight of the total monomer concentration. The concentration is typically up to 35%, and is dependent upon the solubility of the particular monomer in the reaction mixture.

The water-soluble initiators which may be used are the well known peroxy, persulfate and azo initiators, including hydrogen peroxide, t-butyl hydroperoxide, sodium persulfate, potassium persulfate, ammonium persulfate, sodium perphospate, ammonium perphospate, potassium perphospate and 2,2-azobis(cyanovaleric acid). The initiator concentration is normally from 0.5 to 20% and preferably from 1 to 10% based on the total weight of the monomers.

Water-soluble copper salts are preferred at levels of from 1 to 200 ppm and more preferred from 1 to 50 ppm. Copper salts include all inorganic or organic compounds that will generate copper ions in aqueous solution. These salts include such salts as copper sulfate, copper nitrate, copper chloride, copper acetate and inert, water-soluble copper complexes.

The polymerization is run to about 20 to 80% solids and most preferably to about 30 to 65% solids. Polymerization temperatures are between from 80° to 150° C., preferably from 90° to 120° C. When run in the batch mode, monomer addition rates are from 1 to 10 hours, preferably from 1 to 6 hours, and when run as a continuous process, residence times of at least 30 minutes should be used. If residual monomer levels are higher than desired, a post-polymerization addition of initiator (chaser catalyst), or initiator and a monomer may be used.

The in-process neutralization solution of from 20 to 80 equivalent percent of base, preferably 40 to 60 percent base, based on the acid content of the monomer mixture, may be added to the reactor linerly throughout the polymerization. Suitable bases include, sodium hydroxide, potassium hydroxide and ammonium hydroxide. The pH of the reaction solution is maintained in the range of from 3 to 7 and most preferably from 4 to 6.

BRIEF DESCRIPTION OF THE DRAWINGS

This invention will now be more fully explained with reference to FIGS. 1 and 2 appended hereto.

Both figures demonstrate the dramatic superiority of using copper salt as the polymerization moderator. FIG. 1 compares the molecular weight of copolymers synthesized using copper to the molecular weight of copolymers synthesized without any metal polymerization moderator. The copper allows for better control of the molecular weight over a wide range of maleic acid content in the copolymer. Without the use of copper salt as the polymerization moderator, the molecular weight of the copolymer increases rapidly to an undesirable level as the amount of maleic acid contained in the copolymer is decreased. FIG. 2 compares using copper salt as opposed to other metals and shows how the phenomenon of stable molecular weight control is unique to copper. Copper is the only metal leading to a copolymer containing 20% maleic acid with a desirable molecular weight. All other metal salts tested lead to gelling of the polymerization solution, except for Fe++ which leads to an undesirable, very high molecular weight copolymer.

Figure 1:
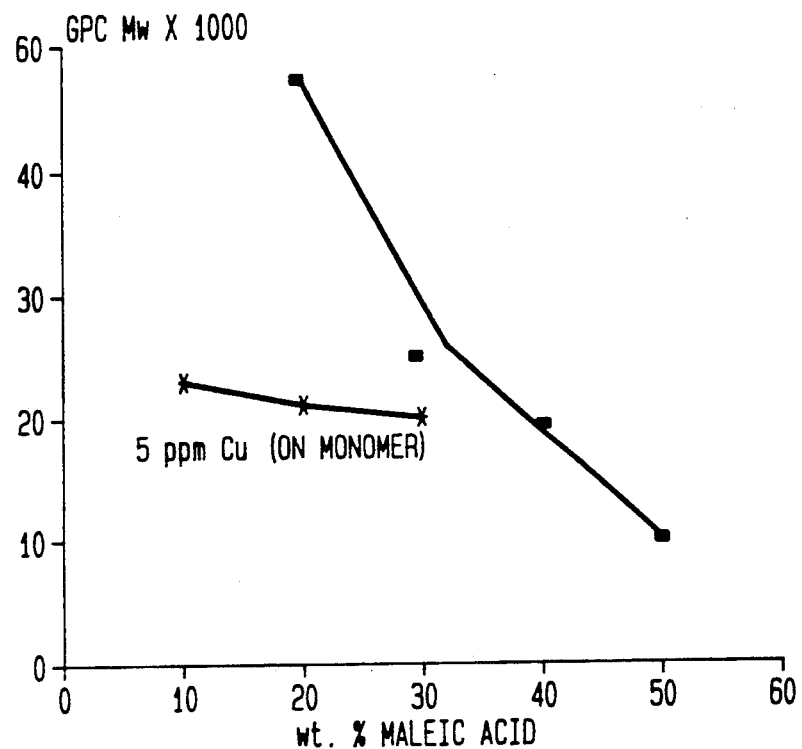
FIG. 1 is a graph of the molecular weight of copolymers synthesized from monomer units of maleic acid and acrylic acid versus the weight percent of maleic acid based on the total weight of the monomers. To furnish a striking comparison, the graph contains two plots, one is the results of the copolymer synthesis without copper and one is the result of the copolymer synthesis with copper as the polymerization moderator.
Figure 2:
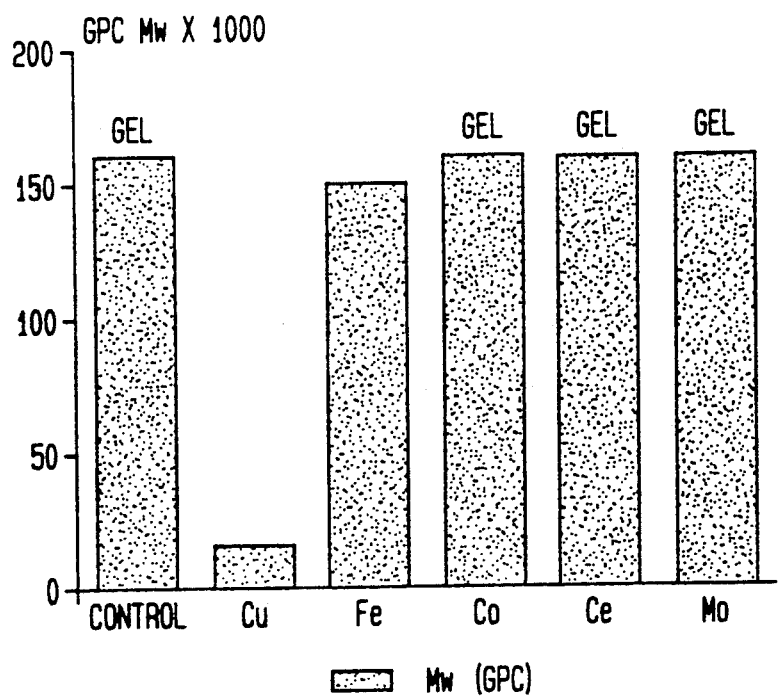
FIG. 2 is a bar graph of copolymer molecular weight versus the type of metal used for the synthesis of a copolymer of 80/20 acrylic acid/maleic acid.

The Figures demonstrate the superiority of using copper as the polymerization moderator in controlling the molecular weight and degree of branching during the polymerization reaction. None of the other common metal ions control molecular weight to the extent copper does. Copper is surprisingly superior to any of the other metal ions previously used.

The copolymers of this invention can be added to detergent compositions in concentrations of up to about 50% by weight, when used as builders, but only from 0.1 to 5.0% by weight, and more preferably from 0.5 to 5.0% by weight to enhance incrustation inhibition (or anti-redeposition of salts). Detergent compositions normally include as the "active" components both a detergent builder and at least one water soluble organic surfactant compound; such as the anionic, nonionic, zwitterionic, and ampholytic surfactants. Particular performance characteristics are imported to detergent formulations by the use of a host of optional ingredients which are mainly intended to enhance the aesthetic effect of the product. Among these are optical brighteners, stain removers, softening agents and perfumes. The chemical nature of these optional detergent additives is not an essential feature of the present invention since these are well known to those skilled in the detergent art.

Examples of other builder compounds which may be used in the detergent composition of the current invention can include the alkali metal salts of carboxymethyloxysuccinic acid and oxydiacetic acid, tetrasodium and tetrapotassium pyrophosphate, pentasodium and pentapotassium tripolyphosphates, ether polycarboxylates, citrates, starch or cellulose derived from polycarboxylates, polyacrylic acids and the like. The copolymers of the present invention are particularly useful as anti-redeposition agents in detergent formulations containing a precipitant builder such as sodium-carbonate. Other materials which may be present in a liquid or powdered detergent composition are those conventionally present therein. Typical examples thereof include soil suspending agents, hydrotropes, corrosion inhibitors, dyes, perfumes, fillers, abrasives, optical brighteners, enzymes, suds boosters, suds dispersants, germicides, anti-tarnishing agents, cationic detergents, softeners, chlorine releasing agents, buffers and the like. The balance of the detergent composition is water.

The detergent composition of the present invention may be in any of the usual physical forms of such compositions, such as powders, beads, flakes, bars, tablets, noodles, liquids, pastes, and the like. The detergent compositions are prepared and utilized in the conventional manner. An additional advantage of the polymers of this invention is that they are biodegradable.

The following specific examples are intended to illustrate particular embodiments of the invention, but are not intended to limit the broader aspects thereof.

EXAMPLE 1

To a two liter four neck flask equipped with a mechanical stirrer, reflux condenser and addition funnels, were added 190 grams of deionized water, 6 grams of a 0.15% by weight solution of copper (II) sulfate pentahydrate dissolved in deionized water and 42.4 grams of maleic anhydride. This solution was heated to reflux at which time 200 grams of glacial acrylic acid, an initiator solution of 40 grams of deionized water and 12.5 grams of sodium persulfate, and a neutralizing solution of 217 grams of 50% sodium hydroxide, 75 equivalent percent based on the monomers, were fed into the flask linearly and separately over 2 hours while maintaining reflux. When the addition was complete the system was held at reflux for twenty minutes, then cooled to 60° C. and the solution pH was adjusted with the addition of 52 grams of a 50% solution of NaOH in water.

The resultant pH 6.7 polymer solution had a solids content of 46.0%. Based on gel permeation chromatography (GPC), the weight average molecular weight (Mw) was 15,200 and the number average molecular weight (Mn) was 7440. Residual maleic acid content was 0.2% and residual acrylic acid content was 0.01%.

EXAMPLE 2

Comparative

The procedure of Example 1 was repeated except that no copper (II) sulfate pentahydrate solution was added to the reactor. The polymerization solution gelled before the additions were completed.

EXAMPLE 3

Comparative

The procedure of Example 1 was repeated except that 6 grams of a 0.15% iron (II) sulfate heptahydrate solution was added to the reactor instead of the copper (II) sulfate pentahydrate.

The resultant pH 6.7 polymer solution had a solids content of 47.0%. Based on GPC, the Mw was 91,100 and the Mn was 9420. Residual maleic acid content was 0.1% and residual acrylic acid content was 0.01%.

EXAMPLE 4

Comparative

The procedure of Example 1 was repeated except that 1.08 grams of a 1.0% cerium (III) sulfate solution was added to the reactor instead of the copper (II) sulfate pentahydrate solution. The polymerization solution gelled before the additions were completed.

EXAMPLE 5

Comparative

The procedure of Example 1 was repeated except that 6.4 grams of a 0.15% cobalt (II) sulfate heptahydrate solution was added to the reactor instead of the copper (II) sulfate pentahydrate solution. The polymerization solution gelled before the additions were completed.

EXAMPLE 6

The procedure of Example 1 was repeated except 3 grams of a 0.15% copper sulfate pentahydrate solution and 50 grams of deionized water were initially added to the reactor. The post reaction pH was adjusted with 30.1 grams of a 50% solution of NaOH in water.

The resultant pH 5.9 polymer solution had a solids content of 44.6%. Based on GPC, the Mw was 33,500 and the Mn was 9,990. Residual acrylic acid content was 0.07% and residual maleic acid content was 0.16%.

EXAMPLE 7

The procedure of Example 1 was repeated except 12 grams of a 0.15% copper sulfate pentahydrate solution was added to the reactor.

The resultant pH 6.8 polymer solution had a solids content of 45.5%. Based on GPC, the Mw was 15,200 and the Mn was 7,930. Residual acrylic acid content was 1.2% and residual maleic acid content was 1.0%.

EXAMPLE 8

Comparative

The procedure of Example 1 was repeated except 1.4 grams of a 1.0% ethylenediaminetetraacetic acid iron (III), monosodium salt solution was added to the reactor. Before the gradual additions could be completed, the polymerization reaction gelled due to the increase in molecular weight.

EXAMPLE 9

The procedure of Example 1 was repeated except 1.4 grams of a 1.0% ethylenediaminetetraacetic acid copper (II), monosodium salt solution was added to the reactor.

The resultant pH 6.8 polymer solution had a solids content of 45.9%. Based on GPC, the Mw was 15,100 and the Mn was 6,090. Residual acrylic acid content was 0.54% and residual maleic acid content was 0.39%.

EXAMPLE 10

The procedure of Example 1 was repeated except 10.6 grams of maleic anhydride was added to the reactor. The monomer cofeed was 237.5 grams of glacial acrylic acid and the base cofeed was 211 grams of a 50% solution of NaOH. The post reaction pH was adjusted with 43.3 grams of a 50% solution of NaOH.

The resultant pH 5.9 polymer solution had a solids content of 42.3%. Based on GPC, the Mw was 37,800 and the Mn was 9,320. Residual acrylic acid content was 0.5% and residual maleic acid content was 0.1%.

EXAMPLE 11

The procedure of Example 1 was repeated except 50 grams of itaconic acid was added to the reactor. The base cofeed was 213 grams of a 50% solution of NaOH. The post reaction pH was adjusted with 62.3 grams of a 50% solution of NaOH.

The resultant pH 12.8 polymer solution had a solids content of 42.4%. Based on GPC, the Mw was 39,600 and the Mn was 9,880. Residual acrylic acid content was 0.09% and residual itaconic acid content was <.01%.

EXAMPLE 12

The procedure of Example 1 was repeated except the initiator cofeed contained 14.1 grams of azo-bis cyanovaleric acid, 8 grams of a 50% solution of sodium hydroxide and 50 grams of deionized water.

The resultant pH 6.2 polymer solution had a solids content of 47.1%. Based on GPC, the Mw was 24,600 and the Mn was 10,200. Residual acrylic acid content was 0.71% and residual maleic acid content was 0.78%.

EXAMPLE 13

The procedure for Example 12 was repeated except no copper sulfate solution was added to the reactor.

The resultant pH 6.9 polymer solution had a solids content of 47.9%. Based on GPC, the Mw was 46,600 and the Mn was 13,900. Residual acrylic acid content was 0.11% and residual maleic acid content was 0.06%.

DETERGENT TESTING

A detergent formulation utilized for the testing of this invention had the following composition: 10% sodium hydroxide, 3% available chlorine, and 5.1% polymer solids. Sodium hydroxide levels of 14% were also employed in some tests to assess the effect of higher levels of alkali on the cleaning performance as compared to the use of the polymer to boost cleaning. Sodium silicate was also used in some of the testing at a level of 4.7% sodium silicate solids, which is equivalent to approximately 3.3 silicate solids ($SiO_2$). The performances of these detergent compositions were compared to a typical commercial product, Interest ® (trademark of the Diversey-Wyandotte Corporation) detergent, which is a phosphate based composition.

The detergents, both those of this invention and the Interest ® detergent, were tested at concentrations of from about 0.2% use level (on an as is basis) to about 1.5% detergent concentration in the bath. The detergents were tested predominantly against a multicycle-deposited cold milk soil. The substrates soiled in the testing were 304 stainless steel panels measuring 1"×3"×0.037". The water used for dilution of the detergent and cleaning of the panels contained from 100 ppm to 600 ppm hardness as $CaCO_3$ and 225 ppm sodium bicarbonate, regardless of the water hardness.

The cold milk soiled panels were prepared by pre-cleaning them with methanol, immersing them in a 1% solution of Interest ® for 15 minutes, rinsing them with deionized water and then drying them. The chemically cleaned panels (6 at a time) were then immersed in fresh whole milk (Vitamin A&D—not skim or low fat) to about ⅝ths of their total length and agitated for exactly 15 minutes. This was the soiling portion of the test.

After the 15 minute soiling process, the panels were removed, rinsed in 120° F. running tap water with a hardness of 200 ppm as $CaCO_3$. Each test panel was then cleaned in detergent solution maintained at 60° C. in a shaker bath. The detergent solution contained the water hardness and detergent concentrations listed in the examples. The detergent solution also contained two drops of milk added as an additional stress to the test. After the panels were exposed to the agitated detergent solution for ten minutes, the test panels were removed and rinsed in 120° F. running tap water. This constituted one cycle.

The panels were then placed back in the milk bath to start the second cycle of soiling and cleaning. In all, each panel was exposed to five complete soiling, cleaning and rinsing cycles.

After the panels were rinsed in tap water for the final time, they were immersed in a 1% protein dye solution for 2-3 minutes (the protein dye used was Safranine ® O). The dye solution immediately attached to any milk soil present that had not been removed by the detergent solutions. Depending on the amount of milk soil remaining on the panel, varying degrees of red stain resulted, the darker the red stain the more milk soil left on the panels. The stained panels were then dried with forced hot air and graded using the following scale:

| Rating | Appearance |
| --- | --- |
| 0 | Panel was clean |
| 1 | A dull film was evident but no red color |
| 2 | Some red stain was seen |
| 3 | Noticeable red color covered 50% of the panel |
| 4 | Red color covered the entire panel |
| 5 | Very deep red color covered the entire panel |

The results of testing demonstrate that the detergents of this invention are useful for the removal of milk soils. The results also show that the copolymers of this invention are superior to previously described acrylic homopolymers, even at equivalent molecular weights, when higher (>300 ppm) water hardnesses are used.

At higher hardnesses all polymer formulations tended to allow the formation of a scale on the test panel. The addition of sodium silicate prevented this scale formation with the copolymers of this invention, but not with acrylic homopolymers.

EXAMPLE 14

| | Water hardness: 100 ppm | | | | | |
| --- | --- | --- | --- | --- | --- | --- |
| | None | Control | Interest ® | A | B | C |
| Stain (Rank) | 1(2) | 1(2) | 0(1) | 0(1) | 0(1) | 2(3) |
| Scale | None | → | → | → | → | → |

Control: 4,500 Mw sodium polyacrylate
Copolymers:
A - 15,200 Mw 80:20 acrylic:maleic, Na salt (from Example 7)
B - 15,300 Mw 80:20 acrylic:maleic, Na salt (from Example 1)
C - 30,000 Mw 65:35 acrylic:maleic, Na salt

EXAMPLE 15

| | Water hardness: 400 ppm | | | |
| --- | --- | --- | --- | --- |
| | Control | Interest ® | A | B |
| Stain (Rank) | 3(3) | 1(1) | 2(2) | 3(3) |
| Scale | None | → | → | → |

Control: 4,500 Mw sodium polyacrylate
Copolymers:
A - 15,300 Mw 80:20 acrylic:maleic, Na salt (from Example 1)
B - 20,000 Mw 90:10 acrylic:maleic, Na salt

EXAMPLE 16

| | Water hardness: 400 ppm | | | | | |
| --- | --- | --- | --- | --- | --- | --- |
| | None | Control | Interest ® | A | B | C |
| Stain (Rank) | 3(3) | 3(3) | 0(1) | 1(2) | 3(3) | 3(3) |
| Scale | None | → | → | → | → | → |

Control: 4,500 Mw sodium polyacrylate
Copolymers:
A - 15,300 Mw 80:20 acrylic:maleic, Na salt (from Example 1)
B - 3,390 Mw 70:20:10 acrylic:maleic:AMPS, Na salt
C - 18,000 Mw 45:35:20 acrylic:maleic:MAA, Na salt

EXAMPLE 17

| | Water hardness: 400 ppm | | | | | |
| --- | --- | --- | --- | --- | --- | --- |
| | None | Control | Interest ® | A | B | C |
| Stain (Rank) | 3(3) | 3(3) | 0(1) | 1(2) | 3(3) | 3(3) |
| Scale | None | → | → | → | → | → |

Control: 4,500 Mw sodium polyacrylate
Copolymers:
A - 15,300 Mw 80:20 acrylic:maleic, Na salt (from Example 1)
B - 26,000 Mw 80:20 acrylic:maleic, Na salt
C - 20,000 Mw 80:20 acrylic:maleic, Na salt

We claim:
1. A process for preparing water-soluble copolymers comprising polymerizing from 3 to 25% by weight based on the total amount of monomers at least one monoethylenically unsaturated dicarboxylic acid containing from 4 to 6 carbon atoms per monomer molecule, the salt or the anhydride of such dicarboxylic acid, 75 to 97% by weight based on the total amount of the monomers of at least one monoethylenically unsaturated monocarboxylic acid containing from 3 to 6 carbon atoms per monomer molecule and, optionally, one or more carboxy-free monoethylenically unsaturated monomer, conducting said reaction in the presence of a water-soluble polymerization initiator, copper salt polymerization moderator and a neutralizer at elevated temperature, and once said polymerization is complete recovering said copolymer.

2. The process of claim 1 wherein said process is selected from the group consisting of a batch process and a cofeed process wherein said batch process consists of establishing an initial reactor charge of said monoethylenically unsaturated dicarboxylic acid to which is added said monoethylenically unsaturated monocarboxylic acids and carboxyl-free monoethylenically unsaturated monomers, water soluble initiator and neutralizer during a period of from 1 to 6 hours and said copper polymerization moderator is contained in said initial charge, added to said reaction as a separate solution or a combination thereof and said cofeed process consists of establishing an initial reactor charge of water to which is gradually added thereto under substantially uniform rates, said monomers, polymerization initiators and neutralizers as separate streams or mixtures thereof and said copper salt polymerization moderator can be contained in said initial charge, added to said reaction during said polymerization or a combination thereof.

3. The process of claim 1 wherein said copper is present in the amount of from 1 to 200 ppm based on the total weight of said polymerization.

4. The process of claim 1 wherein said monoethylenically unsaturated dicarboxylic acid concentration ranges from 5 to 23% by weight based on the total amount of the monomers.

5. The process of claim 1 wherein said monoethylenically unsaturated dicarboxylic acid is selected from the group consisting of maleic acid, itaconic acid, mesaconic acid, fumaric acid, and citraconic acid.

6. The process of claim 1 wherein said monoethylenically unsaturated dicarboxylic acid is maleic acid.

7. The process of claim 1 wherein the polymerization is run at a solids level in the range of from 20 to 80% based on the total weight of the reaction solution.

8. The process of claim 1 wherein the polymerization is run at a solids level in the range of from 30 to 65% based on the total weight of the reaction solution.

9. The process of claim 1 wherein said monoethylenically unsaturated monocarboxylic acid monomer is selected from the group consisting of acrylic acid, methacrylic acid, vinyl acetic acid, crotonic acid and acryloxypropionic acid.

10. The process of claim 1 wherein said monoethylenically unsaturated monocarboxylic acid monomer is acrylic acid.

11. The process of claim 1 wherein said carboxyl-free monoethylenically unsaturated monomer is selected from the group consisting of alkyl esters of acrylic or methacrylic acids; hydroxyalkyl esters of acrylic or methacrylic acids; acrylamide, methacrylamide, N-tertiary butyl acrylamide, N-methyl acrylamide, N,N-dimethyl acrylamide; acrylonitrile, methacrylonitrile, allyl alcohol, allyl sulfonic acid, allyl phosphonic acid, vinylphosphonic acid, dimethylaminoethyl acrylate, dimethylaminoethyl methacrylate, phosphoethyl methacrylate, N-vinyl pyrollidone, N-vinylformamide, N-vinylimidazole, vinyl acetate, styrene, vinyl sulfonic acid and its salts, and 2-acrylamido-2-methyl propane sulfonic acid (AMPS) and its salts.

12. The process of claim 1 wherein the initiator concentration ranges from 0.5 to 20% by weight based on the weight of the monomers and wherein the initiator is selected from the group consisting of hydrogen peroxide, t-butyl hydroperoxide, sodium persulfate, potassium persulfate, ammonium persulfate, sodium perphosphate, ammonium perphosphate, potassium perphosphate and 2,2-azobis(cyanovaleric acid).

13. The process of claim 1 wherein the initiator concentration ranges from 1–10% by weight based on the weight of the monomers.

14. The process of claim 1 wherein the polymerization pH is maintained in the range of 4 to 6 by the addition of from 30 to 80 equivalent percent of base, based on the acid content of the monomer mixture.

* * * * *